United States Patent [19]

Wideman et al.

[11] Patent Number: 4,996,295
[45] Date of Patent: Feb. 26, 1991

[54] AMIDE LINKED ROSIN ACID DERIVATIVES

[75] Inventors: Lawson G. Wideman; Paul H. Sandstrom, both of Tallmadge, Ohio

[73] Assignee: The Goodyear Tire & Rubber Company, Akron, Ohio

[21] Appl. No.: 411,972

[22] Filed: Sep. 25, 1989

[51] Int. Cl.$^5$ ................................................ C09F 1/04
[52] U.S. Cl. ..................................... 530/221; 524/270; 524/272; 524/274; 530/211
[58] Field of Search ................................. 530/221, 215

[56] References Cited

U.S. PATENT DOCUMENTS

| | | | |
|---|---|---|---|
| 2,510,063 | 6/1950 | Bried | 530/221 |
| 4,324,710 | 4/1982 | Davis et al. | 524/76 |
| 4,419,470 | 12/1983 | Davis et al. | 524/76 |
| 4,566,997 | 1/1986 | Satoh et al. | 530/221 |
| 4,775,496 | 10/1988 | Wideman et al. | 530/221 |

FOREIGN PATENT DOCUMENTS 1441555  5/1966  France .

*Primary Examiner*—John Kight, III
*Assistant Examiner*—Dennis R. Daley
*Attorney, Agent, or Firm*—Bruce J. Hendricks

[57] ABSTRACT

The present invention relates to amide linked rosin acid derivatives which are useful as a total or partial replacement for extender or processing oil in rubber formulations. The amide linked rosin acid derivatives improve Strebler adhesion in rubber compositions and also significantly reduce rheometer t25 and t90 values. The amide linked rosin acids are prepared by reacting abietylamine or dehydroabietylamine with abietic acid or dehydroabietic acid under amidation conditions.

10 Claims, No Drawings

AMIDE LINKED ROSIN ACID DERIVATIVES

BACKGROUND OF THE INVENTION

Both natural and synthetic elastomers usually require the use of processing aids to assist mechanical breakdown and compounding. Materials such as mixtures of oil soluble sulfonic acids of high molecular weight with a high boiling alcohol, paraffin oils, blends of sulfonated petroleum products and selected mineral oils are conventionally used as processing aids. Additional examples include petroleum, paraffinic and vegetable oils, coal tar, petroleum residues or pitches and naturally occurring or synthetic resins.

One advantage in using processing aids is they assist the incorporation of fillers and other ingredients with low power consumption since they reduce internal friction in calendering and extrusion. By reducing the amount of friction during compounding, the temperature of the rubber will remain lower and thus minimize the possibility of scorch.

Various types of rosin acids have been used as extenders for high molecular weight SBR. See *Properties of GR-S Extended With Rosin Type Acids,* L. H. Howland, J. A. Reynolds, and R. L. Provost, Industrial and Engineering Chemistry, Vol. 45, No. 5, May 1953. Whereas reasonably good cured physical properties can be obtained with the rosin type acids, there are problems associated with their use which include cure retardation, high tack and poor low temperature performance, which limit their use as an extender in rubber formulations.

U.S. Pat. No. 4,478,993 discloses the use of decarboxylated rosin acid also known as thermal oil as a total or partial replacement for oil in a rubber formulation. Compared with the use of aromatic extending oils in rubbers, decarboxylated rosin acids provide comparable processing and low temperature performance and superior abrasive resistance.

SUMMARY OF THE INVENTION

The present invention relates to amide linked rosin acid derivatives of the formula:

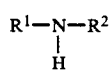

wherein $R^1$ is of the formula comprising:

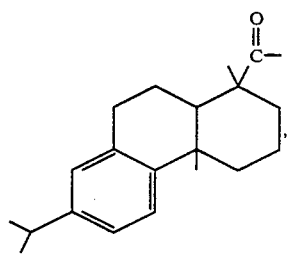

or mixtures thereof and $R^2$ is of the formula comprising:

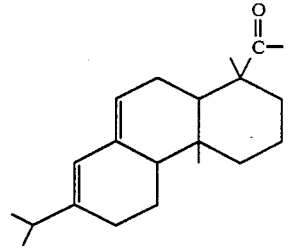

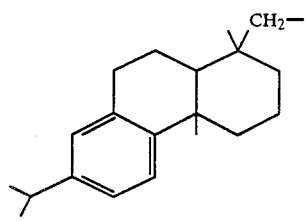

or mixtures thereof.

DETAILED DESCRIPTION OF THE INVENTION

There is also disclosed a process for preparing rubber compositions which comprises admixing a rubber selected from the group consisting of natural rubber, homopolymers of conjugated diolefins, copolymers of conjugated diolefins and ethylenically unsaturated monomers or mixtures thereof with amide linked rosin acid derivatives.

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and an amide linked rosin acid derivative of the formula:

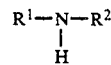

wherein $R^1$ is of the formula comprising:

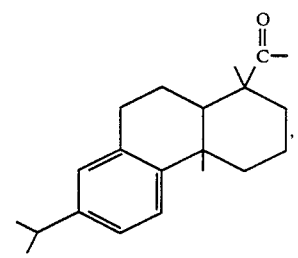

-continued

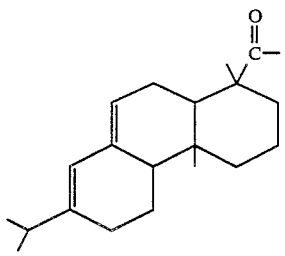

or mixtures thereof and R² is of the formula comprising:

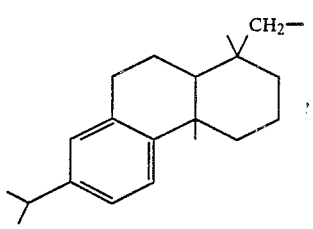

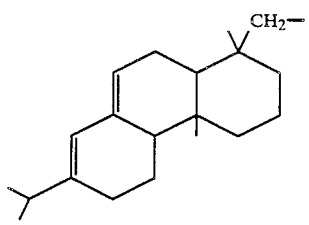

or mixtures thereof.

The amide linked rosin acid derivative is prepared by reacting abietylamine or dehydroabietylamine with abietic acid or dehydroabietic acid. All of these reactants are derived from rosin. Rosin is a solid resinous material that occurs naturally in pine trees. The three major sources of rosin are gum rosin, wood rosin and tall oil rosin. Gum rosin is from the oleoresin extrudate of the living pine tree. Wood rosin is from the oleoresin contained in the aged stumps. Tall oil rosin is from the waste liquor recovered as a by-product in the Kraft paper industry.

The aged virgin pine stump is the source of wood rosin. The stump is allowed to remain in the ground for about ten years so that its bark and sapwood may decay and slough off to leave the heartwood rich in resin. It is known that production of pine stump rosin can be artificially stimulated by injecting the herbicide, Paraquat, into the lower portion of the tree. This treatment of the stump produces Pinex ™ rosin.

Rosins derived from both oleoresin and aged stump wood are composed of approximately 90% resin acids and 10% nonacidic components. Chemical treatment of rosins, such as hydrogenation, dehydrogenation, or polymerization are known which produce modified resins.

Rosin acids are monocarboxylic acids having the typical molecular formula, $C_{20}H_{30}O_2$. The two major rosin acids that may be used in the present invention are abietic acid of the structural formula:

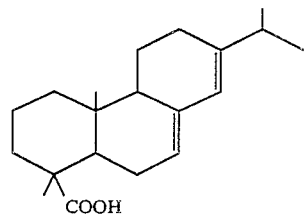

and dehydroabietic acid, having the structural formula:

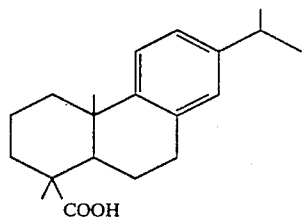

These acids are generally in a mixture with various amounts of other rosin acids including levopimaric, neoabietic, palustric, tetrahydroabietic, pimaric, isopimaric, Δ-isopimaric, elliotinoic and sandaracopimaric. These acids can be used in combination with the abietic or dehydroabietic acid to form the compositions of the present invention. Therefore, in connection with the above formula, R¹ may contain the reaction product of levopimaric, neoabietic, palustric, tetrahydroabietic, pimaric, isopimaric, Δ-isopimaric, elliotinoic or sandaracopimaric acid with the respective rosin amine.

The acid number for the rosin acid may vary. Generally the acid number ranges from about 160 to about 175. Preferably the acid number is below 170 with a range of from about 165 to about 168 being particularly preferred.

The rosin acid is reacted with abietylamine or dehydroabietylamine under suitable conditions to form a compound having two rosin moieties connected by an amide linkage. Dehydroabietylamine in a 90% purity is commercially available from Aldrich Chemical Company. Abietylamine and dehydroabietylamine can be used individually or more commonly in mixtures with various amounts of other rosin amines including levopimarylamine, neoabietylamine, palustrylamine, tetrahydroabietylamine, pimarylamine, isopimarylamine, Δ-isopimarylamine, elliotinoylamine and sandaracopimarylamine. Therefore, in connection with the above formula, R² may also be derived from use of the above amines which are commonly found in admixture with abietylamine and/or dehydroabietylamine.

The rosin acid may be reacted with the abietylamine and/or dehydroabietylamine in a variety of mole ratios. Generally the mole ratio of rosin acid to abietylamine and/or dehydroabietylamine ranges from about 1.5:1 to about 0.75:1 with a range of from about 1.1:1 to about 0.9:1 being preferred.

An organic solvent may be used to dissolve the rosin acid and the abietylamine or dehydroabietylamine. The solvent is preferably inert to the amidation reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the rosin acid, dissolve the abietylamine or dehydroabietylamine and not interfere with the amidation reaction.

The amidation reaction may be conducted in the presence of a catalyst to speed up the reaction. Examples of catalysts that may be used include acid catalysts such as sulfuric acid, hydrochloric acid and toluenesulfonic acid. The amount of catalyst that may be used will vary depending on the particular catalyst that is selected. For example, when an acid catalyst is used, from about 5% to about 10% by weight of the rosin acid is recommended.

The amidation reaction may be conducted over wide temperatures. The temperatures may range from moderate to an elevated temperature. In general, the amidation reaction may be conducted at a temperature of between about 150° C. to about 300° C. In most cases, when operating at the lower end of the temperature range, it is desirable to utilize pressures at the higher end of the range. The preferred temperature range is from about 175° C. to about 275° C., while the most preferred temperature range is from about 200° C. to about 250° C.

The amidation reaction may be conducted under a variety of pressures. Pressures ranging from about 0 psig to about 100 psig may be used to conduct the amidation reaction.

The amidation reaction is conducted for a period of time sufficient to produce the desired amide linked rosin acid derivatives. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, total gas pressure, partial pressure exerted by its components, concentration and choice of solvent, and other factors. Desirably, the amidation reaction is conducted until the acid number of the products range from about 5 to about 30.

The process for the preparation of the amide linked rosin acid derivatives may be carried out in a batch, semi-continuous or continuous manner. The amidation reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control temperature fluctuations. Preferably, an agitation means is available to ensure the uniform reaction. Mixing induced by vibration, shaker, stirrer, rotating, oscillation, etc. are all illustrative of the types of agitation means which are contemplated for use in preparing the composition of the present invention. Such agitation means are available and well known to those skilled in the art.

Addition of the amide linked rosin acid derivatives to sulfur vulcanizable elastomers as a processing oil surprisingly enhances cure rate and the adhesion properties of the vulcanizate. The term "rubber" or "elastomer" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene: olefins, for example, isobutylene, which copolymerizes with isoprene to form butyl rubber: vinyl compounds, for example vinylchloride, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the amide linked rosin acid derivatives are natural rubber, polybutadiene, SBR and polyisoprene.

The rubber vulcanizates containing the amide linked rosin acid derivatives may be used in the preparation of motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like.

The amide linked rosin acid derivatives may be used in a wide variety of proportions in the rubber and may be a substitute, in whole or part for conventional extender or process oils. By the term "extender or process oils", it is meant oils such as aromatic oils, naphthenic oils, paraffinic oils and the like as well as blends thereof. Specific examples of such oils include those largely composed of naphthenic and alkylated naphthenic hydrocarbons and mixtures thereof with various aromatic hydrocarbons. Such oils may be obtained from the high boiling fractions of the so-called naphthenic or mixed crude oils. They may comprise distillate fractions boiling above about 200° C. Suitable fractions are those at least 90 percent of which boil above about 250° C. as more volatile members may be lost during or after compounding and curing the rubber. Generally, the level of amide linked rosin acid derivatives that may be added to the rubber composition may range from about 2 phr (parts per hundred rubber) to about 50 phr. Preferably the amount of amide linked rosin acid derivatives that is added ranges from about 5 phr to about 35 phr.

The following examples are presented in order to illustrate but not limit the present invention.

EXAMPLE 1

150 grams (0.5 mole) of tall oil rosin (crude abietic acid) with an acid number of 168 and 159 grams (0.5 mole) of crude dehydroabietylamine (90%) were added to 11 grams of toluenesulfonic acid in 54 ml of toluene. The mixture was added to a 3-neck, 1-liter flask equipped with a Dean-Stark trap, a pot thermometer and sealed with a nitrogen balloon. After 24 hours at a pot temperature of 240° C with reflux, 100% of the theoretical amount of water was removed. FTIR analysis indicated the disappearance of the acid function and formation of the amide linked rosin acid derivative. The resulting heavy oil, after vacuum-oven drying at 80° C for 8 hours, showed a high degree of tack and had an acid number of 18.

EXAMPLES 2-5

Rubber compositions containing the materials set out in Table I were prepared in a BR Banbury using two separate stages of addition The sulfur and accelerators were added to the compounds during the second stage of mixing. The processing oils (naphthenic/paraffinic oil, thermal oil, methyl ester of rosin acid or amide linked rosin acid derivative) were added to the Banbury during the first stage of mixing. The thermal oil was a decarboxylated rosin acid prepared in accordance with U.S. Pat. No. 4,478,993 and had an acid number of 10.

The methyl ester of rosin acid was purchased from Hercules, Inc. of Wilmington, Delaware under the trademark Hercolyn D TM. The amide linked rosin acid derivative was prepared in accordance with Example 1. Table II below sets out the physical data from the four examples.

TABLE I

| Material | Parts By Weight | Banbury Stage |
| --- | --- | --- |
| Shell 901 TM [1] | 50.0 | 1 |
| Natsyn 2200 TM [2] | 50.0 | 1 |
| GPT Carbon Black | 45.0 | 1 |
| Processing Oil | 9.0 | 1 |
| Antioxidant | 3.0 | 1 |
| Fatty Acids | 3.0 | 1 |
| Wax | 1.0 | 1 |
| Zinc Oxide | 3.0 | 1 |
| Accelerators | 1.2 | 2 |
| Sulfur | 1.6 | 2 |

[1] A solution styrene butadiene rubber which has a styrene content of 23.5% by weight and is commercially available from Shell Oil Company of Houston, Texas.
[2] A polyisoprene rubber commercially available from The Goodyear Tire & Rubber Company.

TABLE II

Cure Behavior and Vulcanizate Properties

| Rheometer 150° C. | Hercolyn D TM | Thermal Oil | Naphthenic/ Paraffinic Oil | Amide Linked Rosin Acid Derivatives |
| --- | --- | --- | --- | --- |
| Max. Torque | 34.8 | 34.8 | 34.5 | 34.7 |
| Min. Torque | 8.1 | 7.8 | 7.7 | 8.3 |
| t90, minutes | 17.7 | 19.4 | 18.3 | 16.1 |
| t25, minutes | 10.4 | 11.4 | 10.7 | 8.6 |
| tl, minutes | 7.4 | 8.1 | 7.8 | 6.7 |
| Stress Strain (original samples) | | | | |
| Tensile Strength (MPa) | 24.2 | 23.4 | 24.0 | 23.0 |
| Elongation at Break (%) | 634 | 627 | 629 | 649 |
| 100% Modulus (MPa) | 1.9 | 1.8 | 1.8 | 1.8 |
| 300% Modulus (MPa) | 8.1 | 8.1 | 8.3 | 7.2 |
| Stress Strain (Air aged 7 days at 70° C.) | | | | |
| Tensile Strength (MPa) | 24.2 | 23.0 | 22.6 | 22.3 |
| Elongation at Break (%) | 579 | 548 | 538 | 567 |
| 100% Modulus (MPa) | 2.5 | 2.6 | 2.5 | 2.4 |
| 300% Modulus (MPa) | 10.4 | 10.7 | 10.3 | 9.4 |
| Stress Strain (Air aged 2 days at 100° C.) | | | | |
| Tensile Strength (MPa) | 15.8 | 15.0 | 13.8 | 14.2 |
| Elongation at Break (%) | 362 | 351 | 313 | 368 |
| 100% Modulus (MPa) | 3.4 | 3.4 | 3.5 | 3.1 |
| 300% Modulus (MPa) | 13.0 | 12.7 | 13.6 | 11.5 |
| Stress Strain (Nitrogen aged 5 days at 121° C.) | | | | |
| Tensile Strength | 15.7 | 15.2 | 13.6 | 14.7 |
| Elongation at Break (%) | 396 | 378 | 359 | 416 |
| 100% Modulus (MPa) | 2.5 | 2.6 | 2.5 | 2.3 |
| 300% Modulus (MPa) | 11.0 | 11.4 | 10.8 | 9.6 |
| Rebound (%, 100° C.) (ASTM D1054) | 65.8 | 65.2 | 64.9 | 61.6 |
| Rebound (%, Room Temp.) | 43.8 | 44.4 | 46.0 | 40.0 |
| Strebler to Self (95° C.) | 80 | 70 | 80 | 92 |

As can be seen from the above data, the Strebler value of 92 for the compounds of the present invention are significantly higher than for the compounds containing naphthenic/paraffinic oil, Hercolyn D TM or thermal oil. The higher Strebler values show increased adhesion of the cured rubber to itself which relates to improved tear resistance. In addition the t25 and t90 values for the amide linked rosin acid derivative indicate faster cure rates compared with the t25 and t90 values for naphthenic/paraffinic oil, Hercolyn D ™ and thermal oil.

What is claimed is:

1. A composition comprising an amide linked rosin acid derivative of the formula:

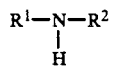

wherein $R^1$ is of the formula comprising:

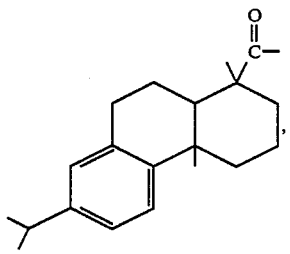

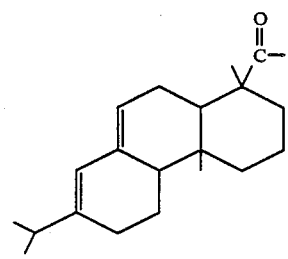

or mixtures thereof an $R^2$ is of the formula comprising:

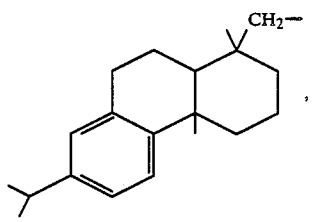

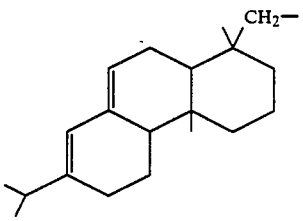

or mixtures thereof.

2. The composition of claim 1 wherein the amide linked rosin acid derivative is the reaction product of abietic acid and dehydroabietylamine.

3. A process for preparing rubber compositions which comprises admixing a rubber selected from the group consisting of natural rubber, homopolymers of conjugated diolefins copolymers of conjugated diolefins and ethylenically unsaturated monomers or mixtures thereof with the amide linked rosin acid derivative of claim 1.

4. The process for preparing rubber compositions according to claim 3 wherein the amide linked rosin acid derivative is at a concentration of from about 2 parts per hundred rubber to 50 parts per hundred rubber and is in an intimate mixture with said rubber.

5. The process for preparing rubber compositions according to claim 4 wherein the amide linked rosin acid derivative is at a concentration of from about 5 to 35 parts per hundred rubber.

6. The composition of claim 1 wherein said composition is added to a rubber selected from the group consisting of natural rubber, homopolymers of conjugated diolefins and copolymers of conjugated diolefins and ethylenically unsaturated monomers.

7. The composition of claim 6 wherein said composition is at a concentration of from about 2 parts per hundred rubber to 50 parts per hundred rubber.

8. The composition of claim 7 wherein said composition is at a concentration of from about 5 to 35 parts per hundred rubber.

9. The composition of claim 1 wherein in addition to abietic acid and dehydroabietic acid, $R^1$ may also be derived from the group consisting of levopimaric acid, neoabietic acid, palustric acid, tetrahydroabietic acid, pimaric acid, isopimaric acid, Δ-isopimaric acid, elliotinoic acid, sandaracopimaric acid, or mixtures thereof.

10. The composition of claim 1 wherein in addition to abietylamine and dehydroabietylamine, $R^2$ may also be derived from levopimarylamine, neoabietylamine, palustrylamine, tetrahydroabietylamine, pimarylamine, isopimarylamine, Δ-isopimarylamine, elliotinoylamine, sandaracopimarylamine or mixtures thereof.

* * * * *